United States Patent [19]

Hochberg

[11] Patent Number: 5,007,192
[45] Date of Patent: Apr. 16, 1991

[54] LAPBOARD

[76] Inventor: Nelson Hochberg, P.O. Box 192, Flagstaff, Ariz. 86002

[21] Appl. No.: 259,715

[22] Filed: Oct. 19, 1988

[51] Int. Cl.$^5$ .............................................. G09F 3/18
[52] U.S. Cl. .......................................... 40/661; 40/904
[58] Field of Search ................ 40/904, 647, 649, 661; 248/444.1, 451

[56] References Cited

U.S. PATENT DOCUMENTS

| | | | |
|---|---|---|---|
| 1,759,544 | 5/1930 | Croes | 40/904 |
| 2,294,276 | 8/1942 | Callinicos | 40/904 |
| 3,465,462 | 9/1969 | Arnt-Jensen | 40/647 |
| 3,533,177 | 10/1970 | Tott | 40/661 |
| 3,553,864 | 1/1971 | Karlyn et al. | 40/904 |
| 3,820,262 | 6/1974 | Dewsnap | 40/661 |
| 4,144,664 | 3/1979 | De Korte | 40/661 |
| 4,530,175 | 7/1985 | Wellman | 40/530 |

FOREIGN PATENT DOCUMENTS 74121  5/1952  Denmark ................ 40/647

Primary Examiner—Gene Mancene
Assistant Examiner—Michael Lynch
Attorney, Agent, or Firm—Cahill, Sutton & Thomas

[57] ABSTRACT

An improved navigation lapboard having two clear sheets clamping sheets of paper between them which allows viewing of the paper and writing on the acrylic sheets without writing directly on the paper. The lapboard is sized to hold an aviation chart and a flight plan side by side and also has holders for writing instruments and clips to compress the plastic sheets together. The lapboard also holds additional writing and reading material on top of the plastic sheets.

2 Claims, 2 Drawing Sheets

LAPBOARD

FIELD OF INVENTION

This invention relates to lapboards and specifically to an improved pilots navigation lapboard.

DISCUSSION OF EXISTING ART

The applicant submitted with the present patent application a copy of pages from a pilot's supplies catalog showing several kneeboards, clipboards and other pilot's lapboards. These represent all of the variations of lapboards that the inventor is aware of. Most lapboards have been small, capable only of holding a small scratch pad or a few sheets from a flight log. Some of these lapboards have clips to hold the logs and some have straps which permit the lapboards to be strapped to a leg. Because of the small size of such lapboard, the strap is necessary to keep the board from falling off the lap. One lapboard, the "Navboard" is made from clear acrylic, designed specifically for placing a chart between the acrylic sheets, but it is small and capable of only holding one folded up aviation chart and does not have holders for pencils or spring clips for approach plates, etc. The "Wild Willie's" kneeboard has a clip and a clear acrylic cover but it is designed only to hold an NOS approach plate. The "tri-fold" kneeboard has a clear vinyl pocket for an aviation chart but it is sized to only store the chart and not display it for reference.

Summary of the Invention

Accordingly several objects of my invention are: it is sized specifically to allow an aviation chart and a flight log to be placed side by side. It can hold several aviation charts and logs stacked at the same time. On the reverse side, another aviation chart and a weather log can be placed side by side. It has large capacity clips allowing approach plates, airport diagrams and other information to be clipped in place. It has holders for two marking pencils, and the plastic allows for writing on it instead of the logs and charts under it. This makes the logs and charts reuseable. It is designed to accommodate varied thicknesses of material within the acrylic sheets and its size allows a stable platform so it doesn't have to be strapped to a leg. Furthermore, other objects and advantages will become apparent from a consideration of the drawings and ensuing descriptions thereof.

DETAILED DESCRIPTION OF THE PREFERRED EMBODIMENTS

Figure 1:
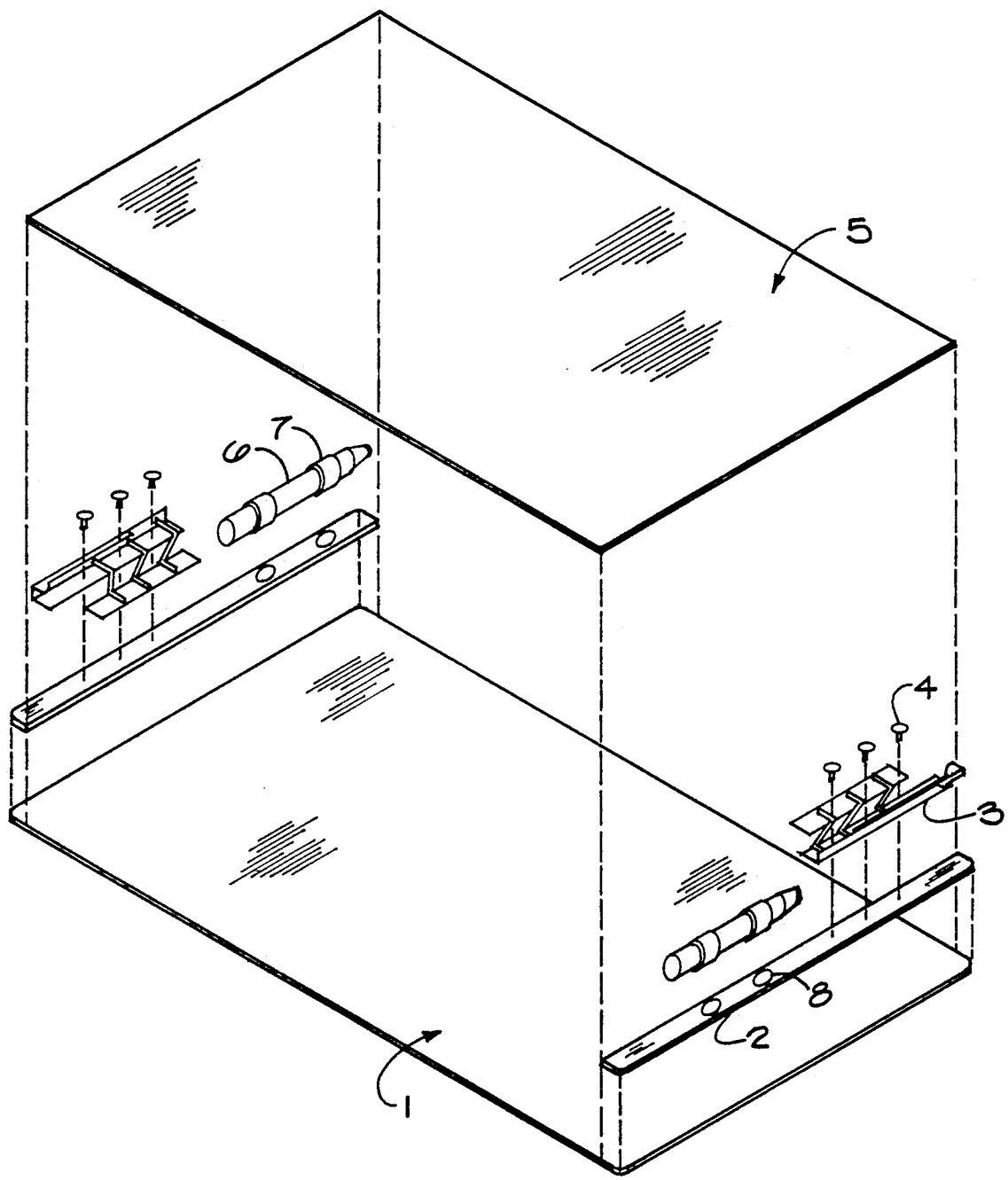
FIG. 1 shows an isometric exploded view of a first embodiment of the invention.

Within FIG. 1, item 1 to a base sheet that is clear, typically made of acrylic. Item 2 is an end piece typically made of acrylic; there are two ends pieces cemented or mechanically bonded to the base sheet to act as spacers. Item 3 is a spring clip, typically made of metal; two are attached to the end pieces with rivets item 4 or other fastening devices. Item 5 is a cover sheet made of clear, material, typically acrylic. Item 6 is a marking pencil (ie: grease pencil or overhead projector marker) held in place in one or two places to the end piece with fabric loop fasteners, spring clips or another holding device items 7 and 8.

Operation: An aviation chart is folded to 10 inch × 10 inch size (a standard folding size for aviation charts) and placed on the left side of the base sheet. A flight log of 6½ inch ×9½ inch size is placed to the right of the chart on the base sheet. optionally, another aviation chart can be placed under the first aviation chart to be viewed on the bottom by flipping the lapboard over. The back side of the flight log or other material placed under the flight log can be viewed when the lapboard is turned over. The cover sheet is then slid over on top of the chart and the log and the spring clips are compressed to hold the cover sheet down. Optionally, a paper or cloth tissue can be placed under one of the clips to be used for erasing marks on the acrylic. Marking pencils are clipped to the appropriate locations on the board. Any semipermanent markings or permanent markings that the pilot wishes to make on the map or log can be done before being placed inside the acrylic sheets. In flight, routings, time information, clearances or any other information the pilot might want to jot down can be written on top of the acrylic sheets using the marking pencil. If necessary, the tissue can be used to erase any of the markings. Departure plates, approach plates and other information, can be clipped under the spring clips. The spring clips are large enough to handle a book up to an inch or more in thickness. With the two spring clips provided, the approach plates can be used on either side pending on whether the pilot wishes to look at the log or the chart. Two books can also be held in pace, one under each clip. Upon preparation for landing, the pilot can quickly put the entire board with all of his navigation information held in place in the back or between the seats out of his way, eliminating clutter in the cockpit. Optionally, lights for viewing at night and a time distance computer, may be attached to the board on the end pieces.

Figure 2:
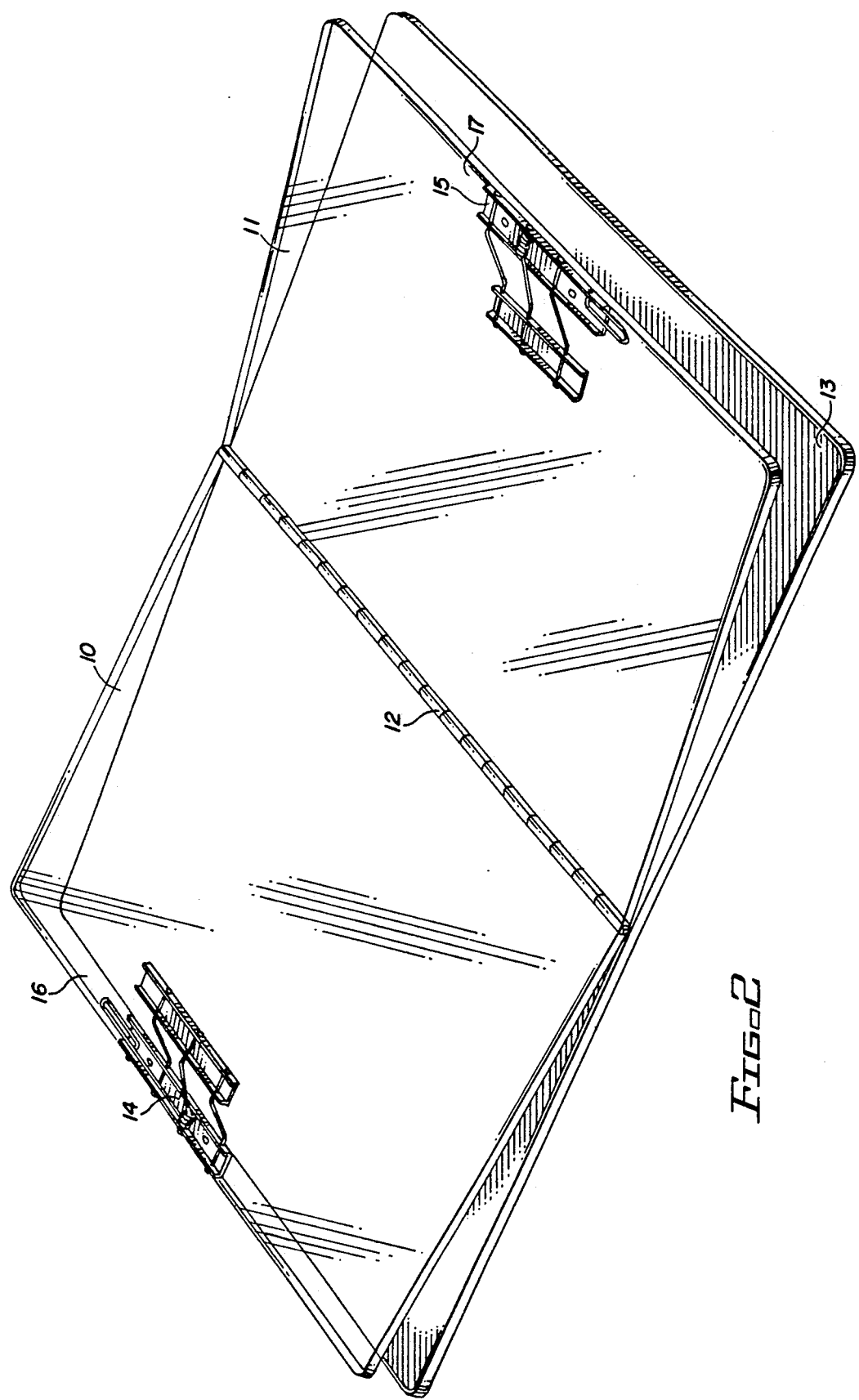
FIG. 2 shows an isometric view of a second embodiment of the invention wherein the cover sheet is split vertically into two separate sheets.

In another embodiment of the lapboard, shown in FIG. 2 the cover sheet is split vertically into two separate sheets, 10 and 11 attached to a hinged spring clip 12 which, in turn, is attached to the base sheet 13. The two cover sheets 10 and 11 each hinge out to place maps or logs in place. Another two spring clips 14 and 15 are then attached to the side edges 16 and 17 of the cover sheet to hold approach plates and other materials.

Although, the above description contains specificities, these should not be construed as limitations on the scope of the invention, but rather as an exemplification of two preferred embodiments thereof. Many other variations are possible. Accordingly, the scope of the invention should be determined not by the embodiment illustrated, but by the appended claims and their legal equivalents.

I claim:

1. A navigation lapboard for holding aviation charts, flight logs, or the like, comprising in combination:
   (a) a clear base sheet for supporting two or more charts or the like, and having first and second opposing edges;
   (b) a hinged spring clip secured to said clear base sheet between the first and second opposing edges thereof; and
   (c) first and second clear cover sheets for covering two or more charts or the like, each of said first and second clear cover sheets being attached to said hinged spring clip and generally overlying said clear base sheet;

whereby each of said first and second clear cover sheets can hinge out to permit a chart or the like to be inserted between each of said clear cover sheets and said clear base sheet.

2. A navigation lapboard as recited by claim 11 wherein each of said first and second clear cover sheets includes a side edge, said lapboard further including at least one spring clip secured to the side edge of one of said clear cover sheets to hold approach plates or the like.

* * * * *